United States Patent
Yu

(10) Patent No.: US 7,317,673 B2
(45) Date of Patent: Jan. 8, 2008

(54) APPARATUS AND METHOD FOR SETTING OFFSET OF DIGITAL, VIDEO DISC, AND APPARATUS AND METHOD FOR ADJUSTING OFFSET

(75) Inventor: Jin-woo Yu, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 508 days.

(21) Appl. No.: 10/669,373

(22) Filed: Sep. 25, 2003

(65) Prior Publication Data
US 2004/0066716 A1 Apr. 8, 2004

(30) Foreign Application Priority Data
Oct. 7, 2002 (KR) ................. 10-2002-0060966

(51) Int. Cl.
*G11B 7/00* (2006.01)
(52) U.S. Cl. ............... 369/53.23; 369/47.41; 369/47.47
(58) Field of Classification Search ........... 369/53.23, 369/47.41, 47.47
See application file for complete search history.

(56) References Cited

U.S. PATENT DOCUMENTS

| | | | |
|---|---|---|---|
| 5,457,587 A * | 10/1995 | Suzuki | 360/77.04 |
| 5,600,615 A | 2/1997 | Kiyoura et al. | 369/44.35 |
| 5,780,989 A * | 7/1998 | Matsumoto | 318/632 |
| 6,252,835 B1 * | 6/2001 | Choi | 369/44.29 |
| 6,781,938 B2 * | 8/2004 | Nanba et al. | 369/59.22 |
| 6,906,888 B1 * | 6/2005 | Trabert et al. | 360/77.13 |
| 6,970,403 B2 * | 11/2005 | Kadlec et al. | 369/44.29 |

FOREIGN PATENT DOCUMENTS

KR 2000-10181 2/2000

* cited by examiner

*Primary Examiner*—Gautam R. Patel
(74) *Attorney, Agent, or Firm*—Staas & Halsey LLP

(57) ABSTRACT

An apparatus for setting an offset in a DVD player includes: an offset measuring unit which measures one or more offset parameters for initial reproducing operations of the DVD player; and an offset setting unit which, when the offset measuring unit measures the one or more offset parameters a number of times, calculates an average value of the measured offset values of the one or more offset parameters and sets, for each of the one or more offset parameters of the DVD player, the average value as a set offset value.

7 Claims, 5 Drawing Sheets

APPARATUS AND METHOD FOR SETTING OFFSET OF DIGITAL, VIDEO DISC, AND APPARATUS AND METHOD FOR ADJUSTING OFFSET

CROSS-REFERENCE TO RELATED APPLICATIONS

This application claims the priority of Korean Patent Application No. 2002-60966 filed Oct. 7, 2002, in the Korean Intellectual Property Office, the disclosure of which is incorporated herein in its entirety by reference.

BACKGROUND OF THE INVENTION

1. Field of the Invention

The present invention relates to an apparatus and method for operating a DVD player, and more particularly, to an offset setting apparatus and method for separately setting and adjusting an offset in a DVD player during an initial reproducing operation of the DVD player, and an offset adjusting apparatus and method for adjusting an offset in a DVD player.

2. Description of the Related Art

In general, a DVD player is an apparatus for reproducing information recorded on various types of optical discs, such as compact discs (CDs), read-only memory compact discs (CD-ROMs), laser discs (LDs), mini discs (MDs), and digital video discs (DVDs).

Adjustment of an offset is carried out during the initial reproducing operation of a DVD player. The initial reproducing operation of a DVD player refers to operations of the DVD player that are performed after an optical disc is inserted into the DVD player and before information recorded on the disc is displayed. During the initial reproducing operation, adjustment of an offset is performed. A method of adjusting an offset in a disc player is disclosed in U.S. Pat. No. 6,252,835.

FIG. 1 is a flowchart illustrating a conventional method of adjusting an offset in a DVD player. In the conventional method, when a DVD player begins the initial reproducing operations, an ABCD offset value is adjusted in operation 100. More specifically, in operation 100, a previously set reference ABCD offset value is replaced with an ABCD sum signal value, which represents a voltage value, output from a photo detector (not shown) in an optical pickup (not shown).

After the adjustment of the ABCD offset value, a focus offset is adjusted in operation 101. That is, a previously set reference focus offset value is updated with a variable of the position of a focus lens, in response to a focus error signal which is detected by the photo detector, calculated, and output.

After operation 101, a constant linear velocity (CLV) of an optical disc is adjusted in operation 102.

After the CLV adjustment, a deviation in the optical disc to be reproduced is adjusted for in operation 103. In general, an optical disc is subject to wear and tear resulting in flaws such as, for example, black dots or scratches. If an optical disc has such flaws, a signal output from the disc may be erroneously read out. If the data is erroneously read out, data recorded on the disc cannot be accurately reproduced. Therefore, in operation 103, flaws of the optical disc are detected and deviations such as eccentricity or deflection are compensated for.

After the deviation adjustment, data to be reproduced is searched for in operation 104 and then reproduced in operation 105.

Conventionally, during the initial reproducing operation of a DVD player, an offset in the DVD player is adjusted by the method illustrated in FIG. 1. However, this method is disadvantageous in that physical impacts or electrical shocks make it difficult to obtain a correct focus/CLV/track error value during reproducing operations of the DVD player. As a result, an offset in a DVD player may be adjusted using incorrect data, thereby causing poor performance of the DVD player.

SUMMARY OF THE INVENTION

The present invention provides an apparatus for setting an offset in a DVD player, in which during an initial reproducing operation of a DVD player, offset values are measured and stored a predetermined number of times and the stored offset values are averaged to set a reference offset value adequate for the DVD player.

The present invention also provides a method of setting an offset in a DVD player, in which during an initial reproducing operation of a DVD player, offset values are measured and stored a predetermined number of times and the stored offset values are averaged to set a reference offset value adequate for the DVD player.

The present invention also provides an apparatus for adjusting an offset in a DVD player, in which during an initial reproducing operation of a DVD player, offset values are measured and stored a predetermined number of times and the stored offset values are averaged to set a reference offset value adequate for the DVD player, and the set reference offset value is updated with a newly-measured offset value.

The present invention also provides a method of adjusting an offset in a DVD player, in which during an initial reproducing operation of a DVD player, offset values are measured and stored a predetermined number of times and the stored offset values are averaged to set a reference offset value adequate for the DVD player, and the set reference offset value is updated with a newly-measured offset value.

Additional aspects and/or advantages of the invention will be set forth in part in the description which follows and, in part, will be obvious from the description, or may be learned by practice of the invention.

According to an aspect of the present invention, there is provided an apparatus for setting an offset in a DVD player, including: an offset measuring unit which measures one or more offset parameters for initial reproducing operations of the DVD player; and an offset setting unit which, when the offset measuring unit measures the one or more offset parameters a number of times, calculates an average value of the measured offset values of the one or more offset parameters and sets, for each of the one or more of the offset parameters, the average value as a set offset value of the DVD player.

The apparatus may also include a counter which counts the number of times the offset parameters are measured to determine the number of times the one or more offset parameters are measured.

The apparatus may also include a storage unit which stores the set offset value of each of the one or more offset parameters.

Further, the one or more offset parameters, may correspond to a sum signal, a position adjustment value of a focus lens, a constant linear velocity (CLV) adjustment value, and a variation adjustment value of an optical disc, the sum signal being a sum of signals A, B, C, and D which are detected from the optical disc using a photo diode (PD) in an optical pickup of the DVD player, the focus lens may be included in the optical pickup, and the CLV adjustment value may be used to determine the rotational velocity at which to rotate the optical disc.

The set offset values may be used as reference offset values during a subsequent initial reproducing operation of the DVD player.

According to another aspect of the present invention, there is provided a method of setting an offset in a DVD player, including: measuring one or more offset parameters for initial reproducing operations of the DVD player; calculating an average value for each of the measured offset values of the one or more offset parameters, when a number of times the one or more offset parameters are measured is the same as a reference number; and setting, for each of the one or more offset parameters, the average value as a set offset value of the DVD player.

The method may also include storing the set offset values.

The set offset values of the one or more offset parameters may be used as reference offset values during a subsequent initial reproducing operation of the DVD player.

Further, the one or more offset parameters may correspond to a sum signal, a position adjustment value of a focus lens, a CLV adjustment value, and a variation adjustment value of an optical disc, the sum signal being a sum of signals A, B, C, and D which are detected from the optical disc using a PD in an optical pickup of the DVD player, the focus lens may be included in the optical pickup, and the CLV adjustment value may be used to determine the rotational velocity at which to rotate the optical disc.

According to yet another aspect of the present invention, there is provided a computer readable medium encoded with processing instructions for implementing a method of setting an offset in a DVD player, the method including: measuring one or more offset parameters for initial reproducing operations of the DVD player; calculating an average value of the measured offset values for each of the one or more offset parameters, when a number of times the one or more offset parameters are measured in the measuring operation is the same as a reference number; and setting, for each of the measured offset parameters, the average value as a set offset value.

According to yet another aspect of the present invention, there is provided an apparatus for adjusting an offset in a DVD player, including: an offset setting unit which measures one or more offset parameters a reference number of times, calculates an average value of each of the offset values of each of the offset parameters, and sets the average values as reference offset values for each of the measured offset parameters; and an offset adjusting unit which compares newly-measured offset values with the reference offset values for each of the one or more offset parameters and adjusts the reference offset values to the newly-measured offset values, the newly-measured offset values being measured during a subsequent initial reproducing operation of a DVD player.

The apparatus may also include a storage unit which stores the reference offset values.

The offset setting unit may also include an offset measuring unit which measures the one or more offset parameters for initial reproducing operations of the DVD player; a counter which counts a number of times the one or more offset parameters are measured; and an operation unit which calculates an average value of the measured offset values for each of the one or more offset parameters, when the offset measuring unit measures the one or more offset parameters a reference number of times and sets the average value as the reference offset value for each of the one or more offset parameters of the DVD player.

The offset adjusting unit may also include a comparator which compares, for each of the one or more offset parameters, the offset values, which are measured during initial reproducing operations of the DVD player with the reference offset value; and an offset adjuster which, based on a comparison result of the comparator, for each of the one or more offset parameters, adjusts the reference offset value to the newly-measured offset value when the newly-measured offset value is different from the reference offset value, the newly-measured offset values being measured during an initial reproducing operation of the DVD player.

Adjustment of an offset in a DVD player may be repeated when an error related to the offset occurs during reproducing operations of the DVD player.

The one or more offset parameters may correspond to a sum signal, a position adjustment value of a focus lens, a constant linear velocity (CLV) adjustment value, and a variation adjustment value of an optical disc, the sum signal being a sum of signals A, B, C, and D which are detected from the optical disc using a photo diode (PD) in an optical pickup of the DVD player, the focus lens may be included in the optical pickup, and the CLV adjustment value may be used to determine the rotational velocity at which to rotate the optical disc.

According to still another aspect of the present invention, there is provided a method of adjusting an offset in a DVD player, including: setting reference offset values for one or more offset parameters by measuring for each of the one or more offset parameters offset parameters a reference number of times, calculating an average value of the measured offset values for each of the one or more offset parameters; and setting, for each of the one or more offset parameters, the average values as the reference offset value; and adjusting the reference offset values to the newly-measured offset values by comparing the newly-measured offset values, which are newly-measured during a subsequent initial reproducing operation of the DVD player, with the reference offset values, and adjusting the reference offset values to the newly-measured offset values.

The setting of the reference offset value values may include measuring an offset value of each of the one or more offset parameters for every initial reproducing operation of the DVD player; calculating an average value of the measured offset values of the one or more offset parameters, when a number of times the one or more offset parameters are measured is equivalent to a reference number; and setting the average value of the one or more offset parameters as the reference offset value for each of the one or more offset parameters of the DVD player and storing the average value.

The adjusting of the offset value may include comparing the newly-measured offset parameters of each of the one or more offset parameters with the reference offset value of each of the one or more offset parameters; and adjusting, based on a comparison result, the reference offset value of each of the one or more offset parameters to the newly-measured offset value of each of the one or more offset parameters when the newly-measured offset value is different from the reference offset value.

Adjustment of an offset value in the DVD player may be repeated when an error related to the offset occurs during reproducing operations of the DVD player.

The one or more offset parameters may correspond to a sum signal, a position adjustment value of a focus lens, a CLV adjustment value, and a variation adjustment value of the optical disc, the sum signal being a sum of signals A, B, C, and D which are detected from an optical disc using a PD in an optical pickup of the DVD player, the focus lens may be included in the optical pickup, and the CLV adjustment value may be used to determine the velocity at which to rotate the optical disc.

According to still another aspect of the present invention, there is provided a computer readable medium encoded with processing instructions for implementing a method of adjusting an offset in a DVD player, the method including: setting a reference offset value by measuring one or more offset parameters a reference number of times, calculating an average value of the offset values for each of the one or more offset parameters, and setting the average values as the reference offset values of the one or more offset parameters; and adjusting the reference offset values of the one or more offset parameters to a newly-measured offset values of the one or more offset parameters by comparing the newly-measured offset values, which are measured during a subsequent initial reproducing operation of the DVD player, with the reference offset values, and adjusting the reference offset values to the newly-measured offset values.

BRIEF DESCRIPTION OF THE DRAWINGS

These and/or other aspects and advantages of the invention will become apparent and more readily appreciated from the following description of the embodiments take in conjunction with the accompanying drawings of which.

DETAILED DESCRIPTION OF THE PREFERRED EMBODIMENTS

Figure 1:
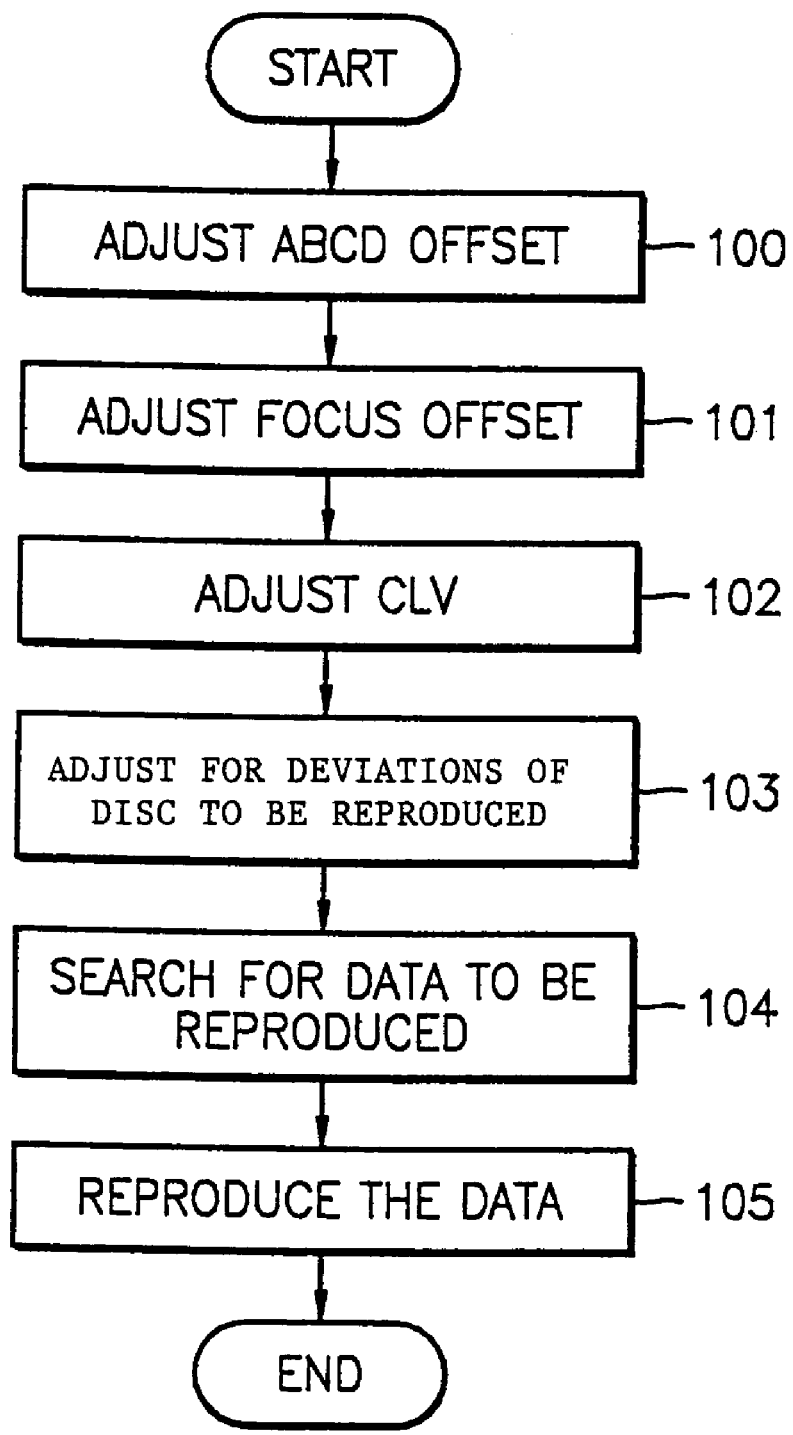
FIG. 1 is a flowchart illustrating a conventional method of adjusting an offset in a DVD player.

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 2:
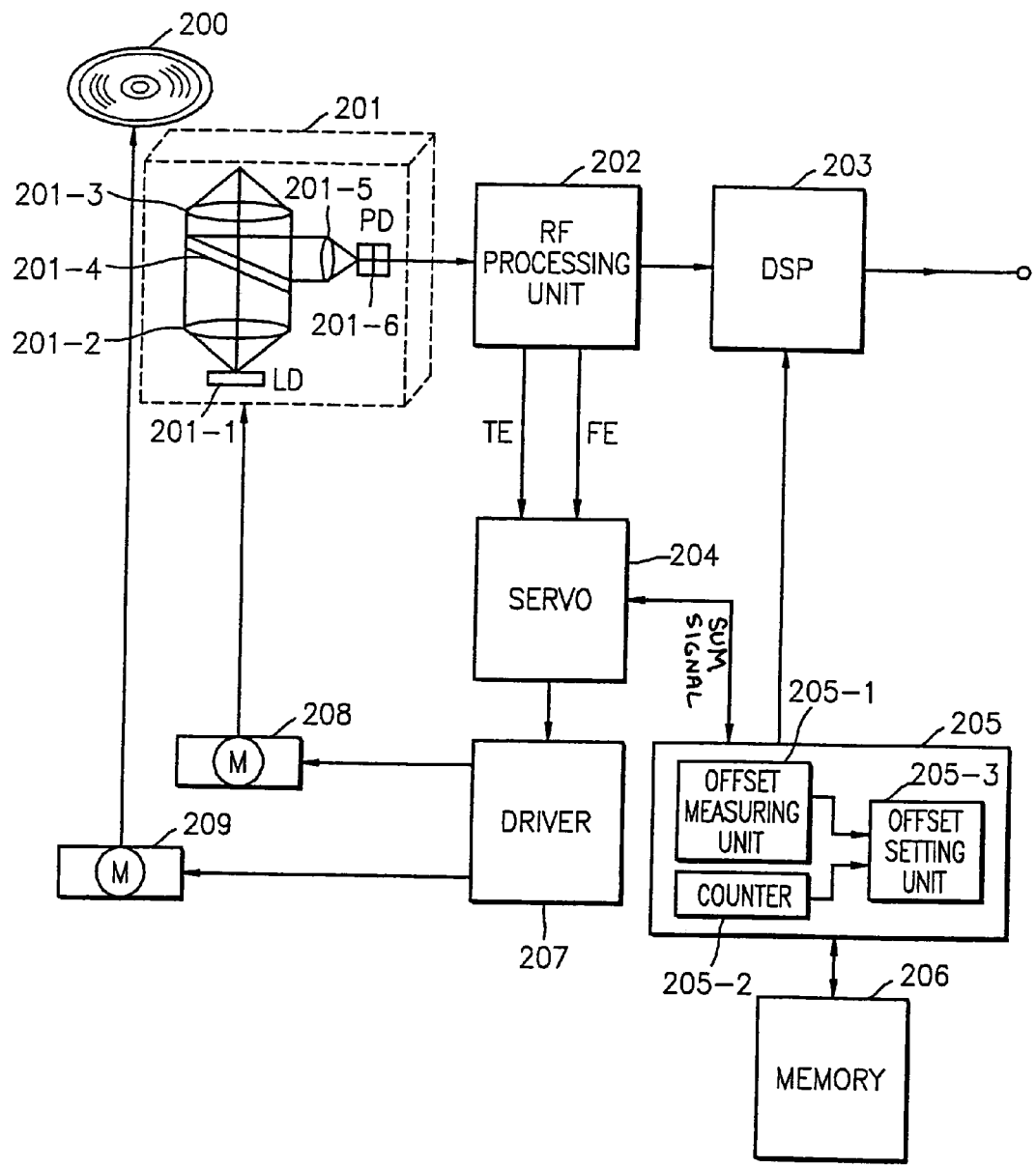
FIG. 2 is a block diagram of the structure of an apparatus for setting an offset in a DVD player, according to an embodiment of the present invention.

FIG. 2 is a block diagram illustrating the structure of an apparatus for setting an offset in a DVD player, according to an embodiment of the present invention. The apparatus of FIG. 2 includes an optical disc 200, an optical pickup 201, a radio-frequency (RF) processing unit 202, a digital signal processor (DSP) 203, a servo 204, a controller 205, a memory 206, a driver 207, a sled motor 208, and a spindle motor 209. The optical pickup 201 includes a laser diode (LD) 201-1, a collimator lens 201-2, a focus lens 201-3, a half mirror 201-4, a condenser lens 201-5, and a photo diode (PD) 201-6. The controller 205 includes an offset measuring unit 205-1, a counter 205-2, and an offset setting unit 205-3.

Figure 3:
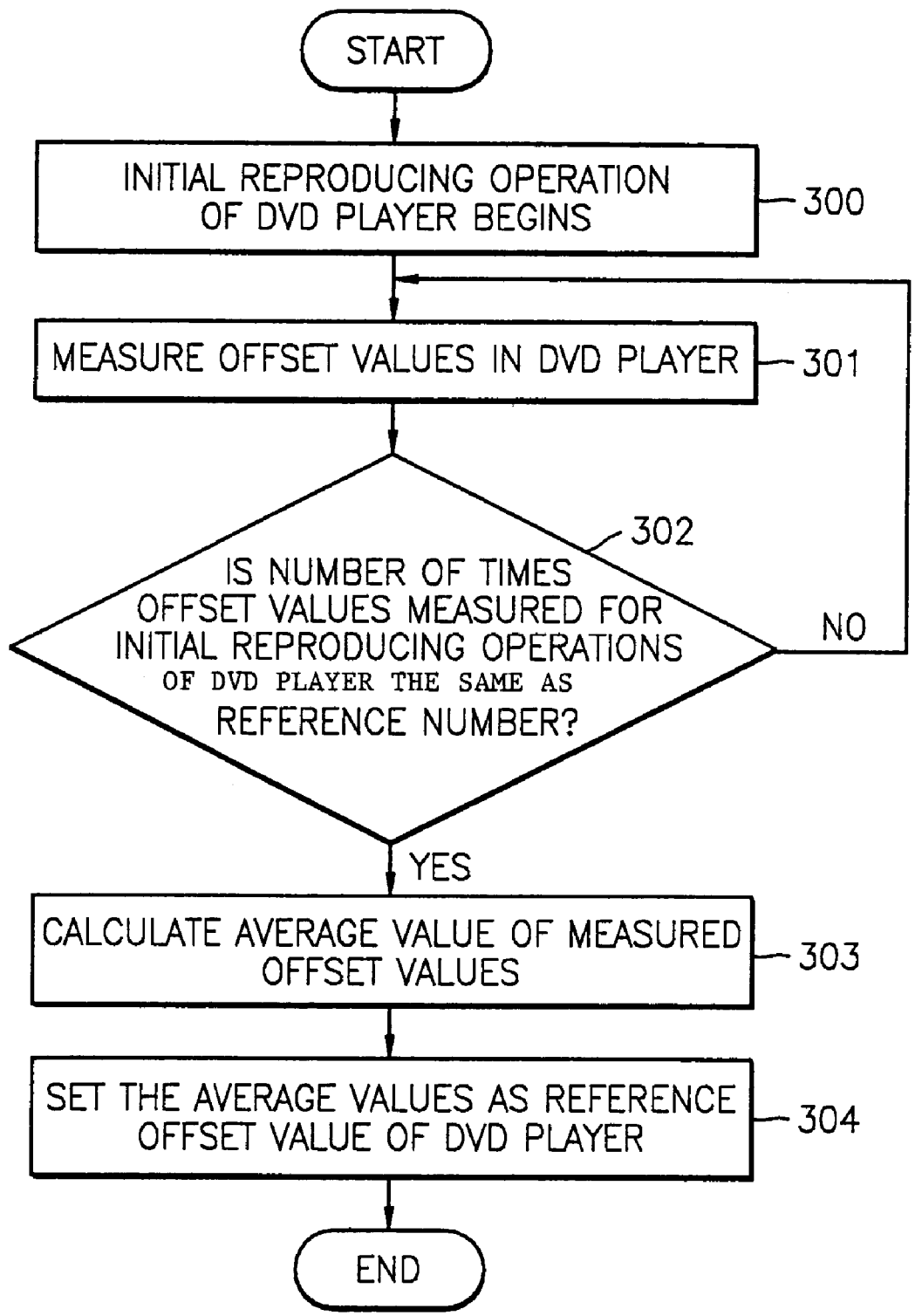
FIG. 3 is a flowchart illustrating a method of setting an offset in a DVD player, according to the apparatus of FIG. 2.

FIG. 3 is a flowchart illustrating a method of setting an offset in a DVD player having the apparatus of FIG. 2. In the method of FIG. 3, an initial reproducing operation of a DVD player is carried out in operation 300, offset values in the DVD player are measured in operation 301, whether the number of times offset values measured for initial reproducing operations of the DVD player is the same as a reference number is checked in operation 302, an average value of the measured offset values is calculated in operation 303, and the calculated average offset value is set as a reference offset value of the DVD player in operation 304.

Hereinafter, an apparatus and method for setting an offset value in a DVD player will be explained with reference to FIGS. 2 and 3.

First, an apparatus for setting an offset in a DVD player will now be described with reference to FIG. 2.

The optical pickup 201 reads out data recorded on the optical disc 200 such as a CD or a DVD. As mentioned above, the optical pickup 201 includes the LD 201-1, the collimator lens 201-2, the focus lens 201-3, the half mirror 201-4, the condenser lens 201-5, and the photo diode (PD) 201-6. The LD 201-1 radiates light to read out the data recorded on a recording surface of the optical disc 200. The collimator lens 201-2 collimates light emitted from the LD 201-1. The focus lens 201-3 focuses the collimated light to form a beam spot on the recording surface of the optical disc 200. The half mirror 201-4 transmits the light collimated by the collimator lens 201-2 and reflects light reflected from the recording surface of the optical disc 200 through the focus lens 201-3, at a right angle. The condenser lens 201-5 condenses the light reflected at a right angle by the half mirror 201-4 and then forms a beam spot on the PD 201-6.

The RF processing unit 202 combines or subtracts from each other electric signals output from the PD 201-6 in the optical pickup 201 so as to output a radio frequency (RF) signal, a focus error signal, and a tracking error signal.

The DSP 203 restores the RF signal output from the RF processing unit 202 to a digital signal. The sled motor 208 moves the optical pickup 201 and the spindle motor 209 rotates the optical disc 200. The driver 207 drives the movement of the sled motor 208 and the rotation of the spindle motor 209. The servo 204 controls operations of the optical pickup 201 and the driver 207.

The controller 205 controls operations of the servo 204 and the DSP 203 and sets an offset in the DVD player. The controller 205, which sets an offset, includes the offset measuring unit 205-1, the counter 205-2, and the offset setting unit 205-3. The offset measuring unit 205-1 measures discrete (i.e., separate) offset parameters of the DVD player whenever the DVD player is energized (turned on). In measuring the offset values of the discrete offset parameters, the offset measuring unit 205-1 measures an ABCD sum signal that represents voltage values output from the PD 201-6 in the optical pickup 201, measures a variable value of the position of the focus lens 201-3 using a focus error signal output from the RF processing unit 202, measures the constant linear velocity (CLV) of the spindle motor 209, and measures a variation adjustment value of an optical disc to be reproduced. Thus, four discrete offset parameters are measured. However, it is to be understood that other offset parameters may be measured. The counter 205-2 counts the number of times the offset measuring unit 205-1 measures the discrete offset parameters. When the number counted by the counter 205-2 is the same as a reference number, the offset measuring unit 205-1 terminates the measurement of the offset parameters. The offset setting unit 205-3 calculates, for each discrete offset parameter measured, an average value of the offset values measured the reference number of times, in order to set a new reference offset value for each measured offset parameters. The newly set reference offset value for each measured offset parameter, which is equal to the calculated average of the measured offset values, is stored in the memory 206.

A method of setting an offset in a DVD player will now be described with reference to FIG. 3. First, an initial reproducing operation of the DVD player begins in operation 300. Next, offset parameters are measured in operation 301. More specifically, in operation 301, the offset measuring unit 205-1 (shown in FIG. 2) measures an ABCD sum signal, which represents a voltage value output from the PD 201-6 (shown in FIG. 2), measures a variable value of the position of the focus lens 201-3 (shown in FIG. 2) using a focus error signal output from the RF processing unit 202 (show in FIG. 2), measures the CLV of the spindle motor 209 (shown in FIG. 2), and measures a variation adjustment value of the optical disc 200 (shown in FIG. 2) to be reproduced. Thus, four discrete offset parameters are measured. However, it is to be understood that other offset parameters may be measured.

After operation 301, the number of times offset values are measured for initial reproducing operations of the DVD player is compared to a reference number, in operation 302. If the measured number is the same as the reference number, the measured offset values for each discrete offset parameter are averaged in operation 303.

The average values are set and stored as a reference offset value in the DVD player, in operation 304. The stored reference offset values may be used during a subsequent initial reproduction of the DVD player.

Figure 4:
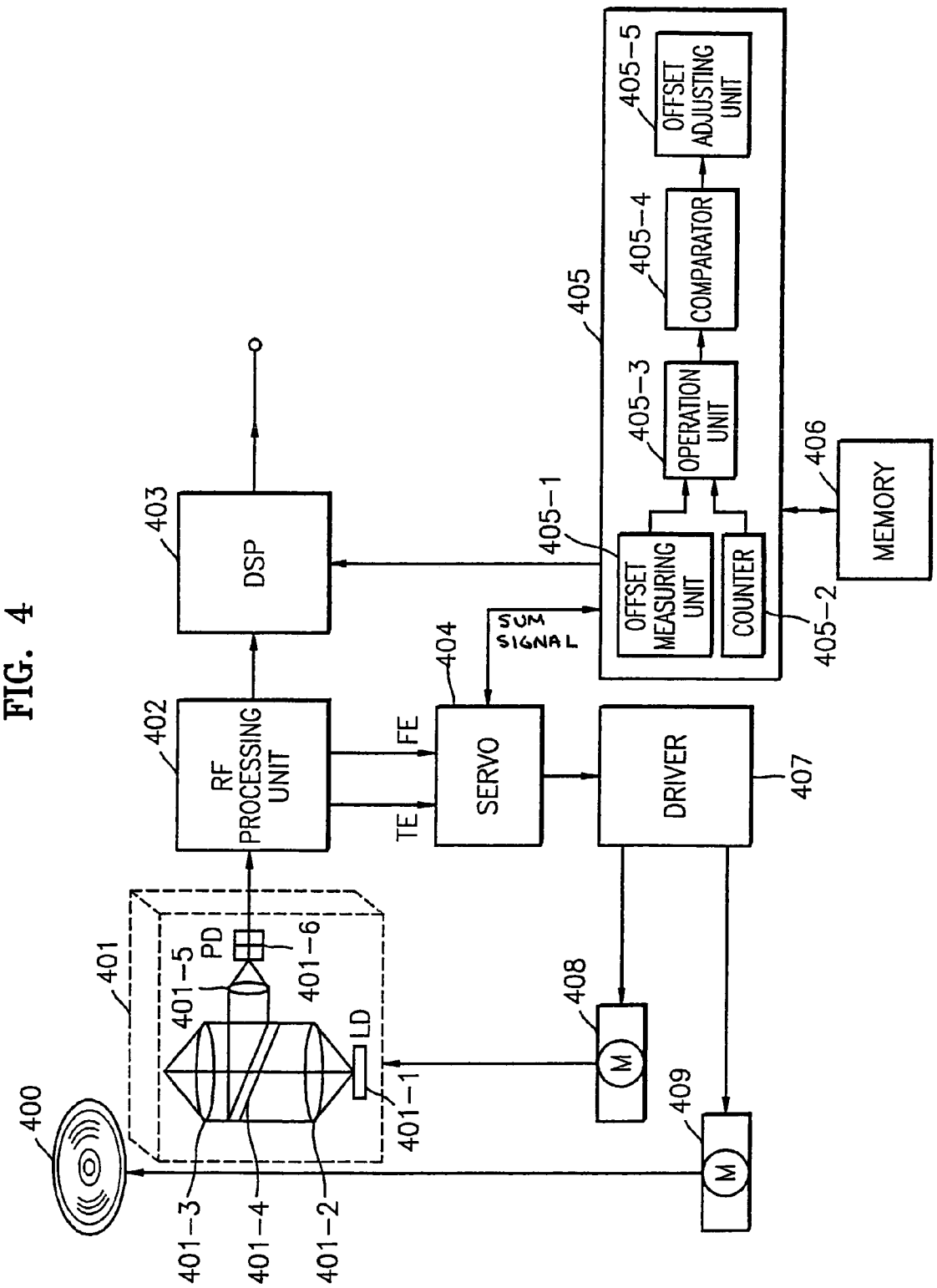
FIG. 4 is a block diagram of the structure of an apparatus for adjusting an offset in a DVD player, according to another embodiment of the present invention.

FIG. 4 is a block diagram illustrating the structure of an apparatus for adjusting an offset in a DVD player, according to another embodiment of the present invention.

The apparatus of FIG. 4 includes an optical disc 400, an optical pickup 401, an RF processing unit 402, a DSP 403, a servo 404, a controller 405, a memory 406, a driver 407, a sled motor 408, and a spindle motor 409. The optical pickup 401 includes an LD 401-1, a collimator lens 401-2, a focus lens 401-3, a half mirror 401-4, a condenser lens 401-5, and a PD 401-6. The controller 405 includes an offset measuring unit 405-1, a counter 405-2, an operation unit 405-3, a comparator 405-4, and an offset setting unit 405-5.

Figure 5:
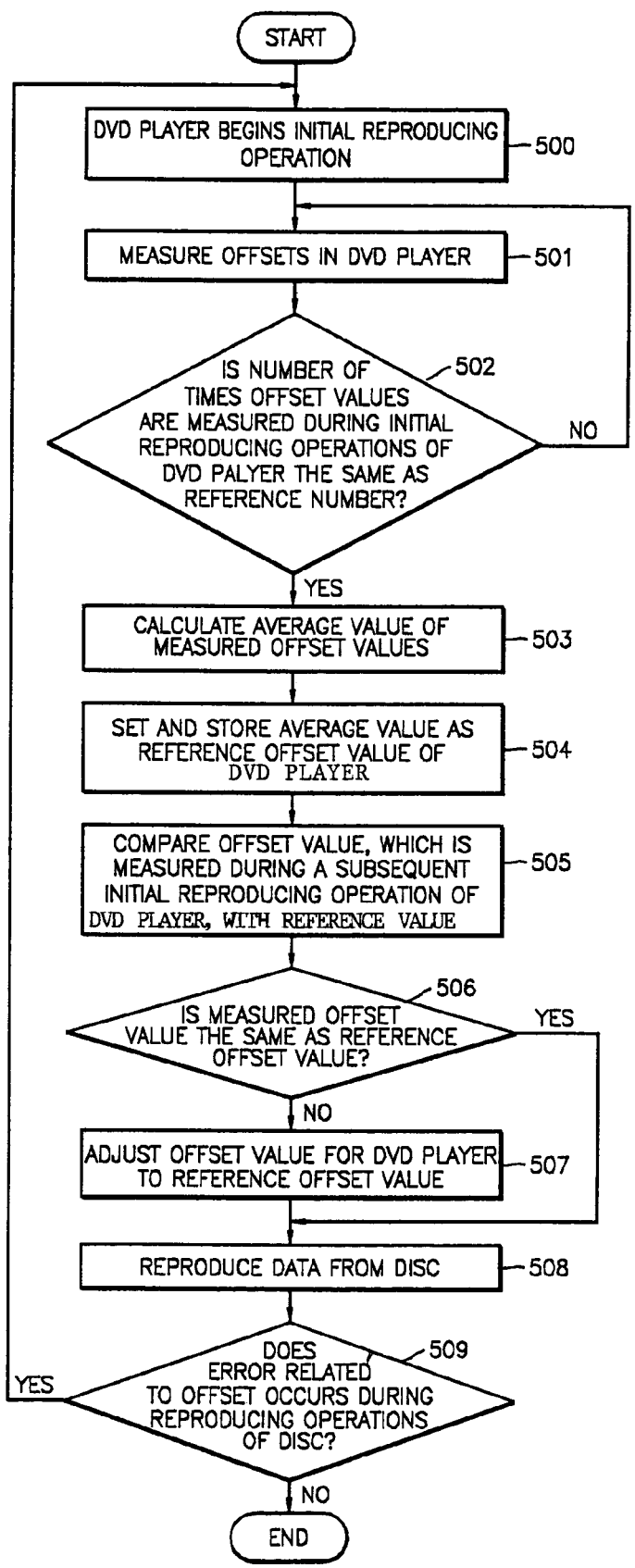
FIG. 5 is a flowchart illustrating a method of adjusting an offset in a DVD player, according the apparatus of FIG. 4.

FIG. 5 is a flowchart illustrating a method of setting an offset in a DVD player having the apparatus of FIG. 4. In the method of FIG. 5, an initial reproducing operation of a DVD player is carried out in operation 500, discrete offset parameters in the DVD player are measured in operation 501, the number of times the offset parameters measured for initial reproducing operations of the DVD player is compared to a reference number in operation 502, an average value of each of the measured discrete offset parameters is calculated in operation 503, and the average offset value is set and stored as a reference offset value of the DVD player in operation 504. After operation 504, newly-measured offset values for each of the discrete offset parameters measured during a subsequent initial reproducing operation of a DVD, are compared with the stored reference offset values, in operation 505. Next, each of the measured offset values is compared to a corresponding reference offset value in operation 506. If it is determined in operation 506 that the measured offset value is not the same as the reference offset value, the reference offset value is adjusted to the measured offset value, in operation 507. After adjustment, or if it is determined in operation 506 that the measured offset value is the same as the reference offset value, the optical disc 200 is reproduced in operation 508. Next, it is checked whether an error related to the offset occurs during reproduction of the optical disc 400, in operation 509.

An apparatus and method for adjusting an offset value in a DVD player will now be explained in greater detail with reference to FIGS. 4 and 5.

First, an apparatus for adjusting an offset in a DVD player will be described with reference to FIG. 4. The optical pickup 401 reads out data recorded on the optical disc 400 such as a CD or a DVD.

As mentioned above, the optical pickup 401 includes the LD 401-1, the collimator lens 401-2, the focus lens 401-3, the half mirror 401-4, the condenser lens 401-5, and the PD 401-6. The LD 401-1 radiates light to read out the data recorded on a recording surface of the optical disc 400. The collimator lens 401-2 collimates light emitted from the LD 401-1. The focus lens 401-3 focuses the collimated light to form a beam spot on the recording surface of the optical disc 400. The half mirror 401-4 transmits the light collimated by the collimator lens 401-2 and reflects light reflected from the recording surface of the optical disc 400 through the focus lens 401-3, at a right angle. The condenser lens 401-5 condenses the light reflected at a right angle by the half mirror 401-4 and then forms a beam spot on the PD 401-6.

The RF processing unit 402 combines or subtracts from each other electric signals output from the PD 401-6 in the optical pickup 401 so as to output an RF signal, a focus error signal, and a tracking error signal.

The DSP 403 restores the RF signal output from the RF processing unit 202 to a digital signal. The sled motor 408 moves the optical pickup 401 and the spindle motor 409 rotates the optical disc 400. The driver 407 drives the movement of the sled motor 408 and the rotation of the spindle motor 409.

The servo 404 controls operations of the optical pickup 401 and the driver 407.

The controller 405 controls operations of the servo 404 and the DSP 403 and sets an offset in the DVD player. The controller 405, which sets an offset, includes the offset measuring unit 405-1, the counter 405-2, the operation unit 405-3, the comparator 405-4, and the offset setting unit 405-3. The offset measuring unit 405-1 measures discrete (i.e. separate) offset parameters of the DVD player whenever the DVD player is energized (turned on). In measuring the offset values of the discrete offset parameters, the offset measuring unit 405-1 measures an ABCD sum signal that represents voltage values output from the PD 401-6 in the optical pickup 401, measures a variable value of the position of the focus lens 401-3 using a focus error signal output from the RF processing unit 402, measures the constant linear velocity (CLV) of the spindle motor 409, and measures a variation adjustment value of the optical disc 400 to be reproduced. Thus, four discrete offset parameters are measured. However, it is to be understood that other offset parameters may be measured. The counter 405-2 counts a number of times the offset measuring unit 405-1 measures the discrete offset parameters. When the number counted by the counter 405-2 is the same as to a reference number, the offset measuring unit 405-1 terminates the measurement of the offset parameters. The offset setting unit 405-3 calculates, for each discrete offset parameter measured, an average value of the offset values measured the reference number of times, in order to set a new reference offset value for each of the measured offset parameters. The newly set reference offset value for each measured offset parameter, which is equal to the calculated average value of the measured offset values, is stored in the memory 406. After the setting of the reference offset values, the comparator 405-4 compares newly-measured offset values of the discrete offset parameters, which are measured during a subsequent initial reproduction operation, with the reference offset value stored in the memory 406, when the DVD player is energized (turned on). The offset adjusting unit 405-5 updates the reference offset values, which are stored in the memory 406, with the newly-measured offset values, when the comparison result of the comparator 405-4 reveals that the newly-measured offset values are different from the reference offset values. After the adjustment of the reference offset values, the optical disc 400 is reproduced. If an error related to the offset occurs during the reproduction of the optical disc 400, the discrete offset parameters are measured and their respective reference values are adjusted again.

A method of setting an offset in a DVD player will now be described with reference to FIG. 5. First, an initial reproducing operation of the DVD player begins in operation 500. Next, discrete (i.e. separate) offset parameters are measured in operation 501. More specifically, in operation 501, the offset measuring unit 405-1 (shown in FIG. 4) measures an ABCD sum signal, which represents a voltage value output from the PD 401-6 (shown in FIG. 4) in the optical pickup 401 (shown in FIG. 4), measures a variable value of the position of the focus lens 401-3 (shown in FIG. 4) using a focus error signal output from the RF processing unit 402 (show in FIG. 4), measures the CLV of the spindle motor 409 (shown in FIG. 4), and measures a variation adjustment value of the optical disc 400 (shown in FIG. 4) to be reproduced. Thus, four discrete offset parameters are measured. However, it is to be understood that other offset parameters may be measured.

After operation 501, the number of times the discrete offset parameters are measured for initial reproducing operations of the DVD player is compared to a reference number, in operation 502. If the measured number of times is the same as the reference number, the measured offset values for each discrete offset parameter are averaged in operation 503.

The average value for each discrete offset parameter is set as a reference offset value in the DVD player and stored in the memory 406 (shown in FIG. 4), in operation 504.

Next, the reference offset value for each discrete offset parameter stored in the memory 406 (shown in FIG. 4) is compared with a newly-measured offset value of each discrete offset parameter that is newly-measured during an initial reproducing operation of the DVD player in operation 505.

After operation 505, it is checked, for each discrete offset parameter, whether the newly-measured offset value is the same as to the reference offset value in operation 506. If it is determined in operation 506 that a newly-measured offset value is different from the reference offset value, the reference offset value is adjusted to the newly-measured offset value in operation 507. If it is determined in operation 506 that a newly-measured offset value is the same as the reference offset value, or after the adjustment of the reference offset value, the optical disc 400 (shown in FIG. 4) is reproduced in operation 508.

After operation 508, it is checked whether an error related to the offset occurs during the reproduction of the optical disc 400 (shown in FIG. 4) in operation 509. If the error related to the offset occurs, the discrete offset parameters of the DVD player is measured and adjusted again. However, if the error does not occur, the measurement and adjustment of the offset parameters are terminated.

According to the above described embodiments of the present invention, offset values for DVD players are differently set, and then, an offset value measured in a DVD player is adjusted to a reference offset value. Accordingly, it is possible to apply an appropriate offset value to a DVD player, thereby improving the performance of the DVD player.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An apparatus for adjusting an offset in a DVD player, comprising:

an offset measuring unit which measures offset parameters, which are composed of a sum signal, a position adjustment value of a focus lens, a constant linear velocity (CLV) adjustment value, and a variation adjustment value of an optical disc, the sum signal being a sum of a plurality of signals which are detected from the optical disc using a photo diode (PD) in an optical pickup of the DVD player, the focus lens being included in the optical pickup, and the CLV adjustment value being used to rotate the optical disc for initial reproducing operations of a DVD player;

an offset setting unit which, when the offset measuring unit measures the offset parameters a number of times, calculates an average value of the measured offset values of the offset parameters and sets the average values as reference offset values for each of the measured offset parameters; and a comparator which compares, for each of the offset parameters, the offset values, which are measured during initial reproducing operations of the DVD player, with the reference offset value; and an offset adjusting unit which, based on a comparison result of the comparator for each of the offset parameters, adjusts the reference offset value to the newly-measured offset value when the newly-measured offset value is different from the reference offset value, wherein the newly-measured offset values are measured during a subsequent initial reproducing operation of a DVD player.

2. The apparatus of claim 1, further comprising a storage unit which stores the reference offset values.

3. The apparatus of claim 1, further comprising:

a counter which counts a number of times the offset parameters are measured.

4. The apparatus of claim 1, wherein, when an error related to the offset occurs during reproducing operations of the DVD player, adjustment of an offset in the DVD player is repeated.

5. A method of adjusting an offset in a DVD player, comprising:

measuring offset parameters of a sum signal, a position adjustment value of a focus lens, a constant linear velocity (CLV) adjustment value, and a variation adjustment value of an optical disc, the sum signal being a sum of a plurality of signals which are detected from the optical disc using a photo diode (PD) in an optical pickup of the DVD player, the focus lens being included in the optical pickup and the CLV adjustment value being used to rotate the optical disc for initial reproducing operations of a DVD player;

calculating an average value of the measured offset values of the offset parameters when a number of times the offset parameters are measured is the same as a reference number;

setting the average value of each of the offset parameters as the reference offset value for each of the one or more offset parameters;

storing the average values;

comparing the newly-measured offset value of each of the offset parameters with the reference offset value of each of the offset parameters; and adjusting, based on a comparison result from the comparing, the reference offset value of each of the offset parameters to the newly-measured offset value of each of the offset parameters when the newly-measured offset value is different from the reference offset value, the newly-measured offset value being measured during a subsequent initial reproduction operation of the DVD player.

6. The method of claim 5, wherein, when an error related to the offset occurs during reproducing operations of the DVD player, the adjustment of the offset value in the DVD player is repeated.

7. A computer readable medium encoded with processing instructions for implementing a method of adjusting an offset in a DVD player, the method comprising:

measuring offset parameters of a sum signal, a position adjustment value of a focus lens, a constant linear velocity (CLV) adjustment value, and a variation adjustment value of an optical disc, the sum signal being a sum of a plurality of signals which are detected from the optical disc using a photo diode (PD) in an optical pickup of the DVD player, the focus lens being included in the optical pickup, and the CLV adjustment value being used to rotate the optical disc for initial reproducing operations of a DVD player;

calculating an average value of the measured offset values of the offset parameters when a number of times the offset parameters are measured is the same as a reference number;

setting the average value of each of the offset parameters as the reference offset value for each of the one or more offset parameters;

storing the average values;

comparing the newly-measured offset value of each of the offset parameters with the reference offset value of each of the offset parameters; and adjusting, based on a comparison result from the comparing, the reference offset value of each of the offset parameters to the newly-measured offset value of each of the offset parameters when the newly-measured offset value is different from the reference offset value, the newly-measured offset value being measured during a subsequent initial reproduction operation of the DVD player.

* * * * *